United States Patent [19]
Ikonen

[11] Patent Number: 5,636,707
[45] Date of Patent: Jun. 10, 1997

[54] LUBRICATION SYSTEM FOR AN ELECTRIC APPARATUS JOURNALLED BY MEANS OF SLIDING BEARINGS

[75] Inventor: Janne P. Ikonen, Helsinki, Finland

[73] Assignee: ABB Industry Oy, Helsinki, Finland

[21] Appl. No.: 545,949

[22] Filed: Oct. 20, 1995

[30] Foreign Application Priority Data

Nov. 10, 1994 [FI] Finland ................................ 945295

[51] Int. Cl.$^6$ .................................................. F01M 5/00
[52] U.S. Cl. .......................... 184/6.22; 184/11.2; 184/65; 184/104.1
[58] Field of Search ............................ 184/6, 6.13, 6.22, 184/65, 72, 11.2, 13.1, 104.1

[56] References Cited

U.S. PATENT DOCUMENTS

| | | | |
|---|---|---|---|
| 2,492,020 | 12/1949 | Thoresen | 184/6.13 |
| 2,551,660 | 5/1951 | Feilden | 184/6.13 |
| 2,817,027 | 12/1957 | Picozzi . | |
| 2,836,471 | 5/1958 | Luenberger . | |
| 3,147,821 | 9/1964 | Eggenberger | 184/72 |
| 3,210,581 | 10/1965 | Jakel . | |
| 3,734,580 | 5/1973 | Piscitelli | 184/6.22 |
| 5,220,978 | 6/1993 | McMaster | 184/6.22 |

FOREIGN PATENT DOCUMENTS

| | | |
|---|---|---|
| 1100787 | 3/1961 | Germany . |
| 3135901 | 3/1983 | Germany . |
| 3838668 | 12/1989 | Germany . |
| 197014 | 5/1923 | United Kingdom . |

OTHER PUBLICATIONS

Patent Abstracts of Japan, vol. 17, No. 35 of 23 Jan. 1993 summarizing JP-A-04255447 of Nobuyuki et al. dated 10 Sep. 1992.

*Primary Examiner*—Thomas E. Denion
*Attorney, Agent, or Firm*—Watson Cole Stevens Davis, P.L.L.C.

[57] ABSTRACT

An electric apparatus mounted in sliding bearings includes an end N at which is located a fan, an end D at which is located a shaft, a rotor journalled at one end by means of a first sliding bearing at the end N and the opposite end journalled by means of a second sliding bearing at the end D, the end N being provided with a first bearing housing with an oil sump for the first sliding bearing and the end D being provided with a second bearing housing with an oil sump for the second sliding bearing, and a passage system which interconnects the oil sumps to enable oil to circulate therebetween and limit the warm up of the slide bearing at end D. Limiting the warm up of the slide bearing at end D enables the rotational speed of the electric apparatus to be increased or allows the electric apparatus to be used in warmer environments than previously possible.

9 Claims, 1 Drawing Sheet

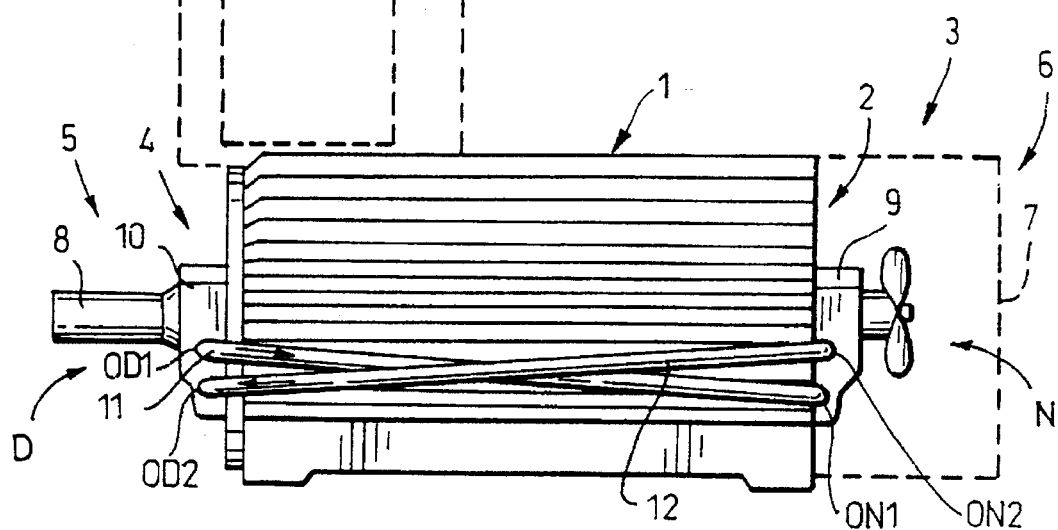
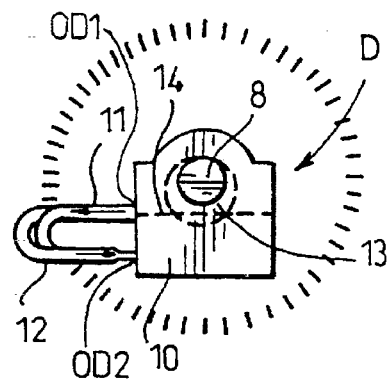
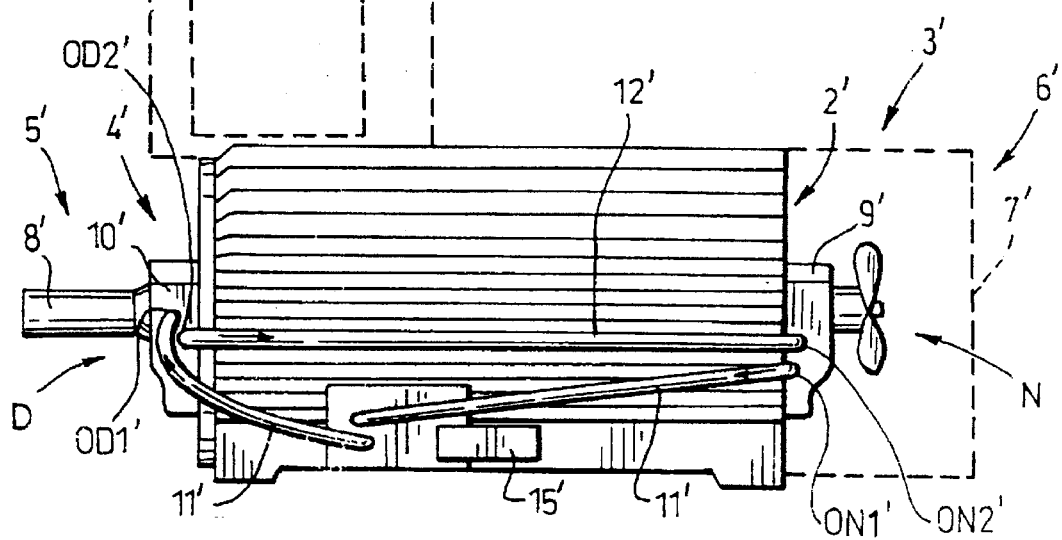

LUBRICATION SYSTEM FOR AN ELECTRIC APPARATUS JOURNALLED BY MEANS OF SLIDING BEARINGS

BACKGROUND OF THE INVENTION

The present invention relates to a lubrication system for an electric apparatus journalled by means of sliding bearings. To be more specific, the invention relates to an electric apparatus that includes an end N at which is located a fan and an end D at which is located a shaft, and a rotor which is journalled at one end by means of a first sliding bearing at the end N and at its opposite end by means of a second sliding bearing at the end D, the end N being provided with a first bearing housing with an oil sump for the first sliding bearing and the end D being provided with a second bearing housing with an oil sump for the second sliding bearing.

Electric apparatuses of the described type are largely known. As rotational speed or ambient temperature increases, the warming up of electric apparatuses may cause problems. The temperature of sliding bearings may rise too high as regards the operation of the bearings, wherefore limits are set regarding the highest operating temperatures of bearings. The warming up of the bearings is a result of the transference of the heat originating from the rotor to the bearings and of bearing friction. Even if the bearings comprise an oil scraper ring, it is not sufficiently capable of lifting colder oil from the lower part of the oil sump to the bearing area to efficiently cool the bearings. In rib-cooled electric apparatuses, the problem is further aggravated by the fact that cooling air passes from the end N to the end D through the ribs past the bearing located at the end D. The cooling air departing from the end N is thus warmed in the cooling ribs while propagating towards the end D, and the cooling capacity thereof essentially deteriorates before it has reached the bearing of the end D. For the reasons mentioned, the difference in temperature between the bearing applications of the end D and the end N is significant.

Experiments have shown, for instance, that for a rib-cooled squirrel-cage motor, the capacity of which was 300 kW, rotational speed 3577 revolutions per minute, frequency 60 Hz and the number of poles 2, the highest temperature at the end D in the bearing was 78.5° C. at ambient temperature of 23.5° C., whereby the warming up of the end D was 55° C. The maximum warming up specified for the motor was 50K, this value being thus exceeded. Correspondingly, the warming up of the end N was 39.4° C. The difference in temperature of the bearings in the end D and the end N was 15.6° C.

SUMMARY OF THE INVENTION

The object of the present invention is to provide a lubrication system for electric apparatuses journalled by sliding bearings, which lubrication system cools the sliding bearings of an electric apparatus more efficiently than heretofore and enables the electric apparatus to be operated at temperatures higher than heretofore and/or rotational speed to be increased without the bearings warming up too much.

To implement this, the electric apparatus of the invention includes a passage system which interconnects the oil sumps of ends N and D and enables the oil located in the oil sumps to circulate between the end N and the end D.

The oil circulation can be implemented with either free or forced circulation within the scope of the invention. The free circulation embodiment of the invention is preferably implemented in such a manner that the passage system includes a first passage having an orifice at the end D and an orifice at the end N, the orifice at the end D being disposed in the vicinity of the oil surface of the oil sump of the end D and the orifice at the end N being disposed in an area below the oil surface of the oil sump of the end N; and a second passage having an orifice at the end N and an orifice at the end D, the orifice at the end N being disposed in the vicinity of the oil surface of the oil sump of the end N and the orifice at the end D being disposed in an area below the oil surface of the oil sump of the end D, the oil circulation being thus implemented with free circulation. Correspondingly, the forced circulation embodiment of the invention is preferably implemented in such a manner that the electric apparatus includes a pump for circulating oil in the passage system, the passage system including a first passage having an orifice at the end D and an orifice at the end N, the orifice at the end D being arranged to feed oil arriving from the end N to the vicinity of the oil surface of the oil sump of the end D and the orifice at the end N being disposed in an area below the oil surface of the oil sump of the end N; and a second passage having an orifice at the end N and an orifice at the end D, the orifice at the end N being arranged to feed oil arriving from the end D to the vicinity of the oil surface of the oil sump of the end N and the orifice at the end D being disposed in the vicinity of the oil surface of the oil sump of the end D.

The invention is based on the idea of directing oil located in the bearing housings from a bearing housing into another by directing relatively hot oil to relatively cold oil, and relatively cold oil to an area where the temperature is relatively high, whereby the differences in temperature of the oil in different parts of the lubrication system are levelled, which results in efficient cooling in the critical parts of the apparatus that are generally inefficiently cooled. The greatest advantage of the electric apparatus of the invention, the apparatus being journalled by sliding bearings, is the fact that the warming up of the sliding bearing at the end D can be reduced, as a result of which the rotational speed of the electric apparatus can be increased and/or the electric apparatus can be operated in ambient temperatures higher than heretofore. A further advantage of the invention is also that it can be applied to existing electric apparatuses by performing minor modifications thereto.

BRIEF DESCRIPTION OF THE DRAWINGS

In the following, the invention will be described in more detail by means of two preferred embodiments with reference to the accompanying drawings, in which FIG. 1 shows an embodiment of the invention, wherein free circulation of the lubricant is utilized, FIG. 2 shows the electric apparatus of FIG. 1 as seen from one end, and FIG. 3 shows a second embodiment of the invention, wherein forced circulation of the lubricant occurs.

DETAILED DESCRIPTION OF THE PREFERRED EMBODIMENTS

The electric motor shown in FIG. 1 comprises a ribbed frame 1 within which is located a rotor which is journalled by means of a first sliding bearing 2 at the end N 3 of the motor, and by means of a second sliding bearing 4 at the end D 5 of the motor. At the end N 3 a fan 6 is provided for blowing cooling air towards the end D 5. The housing 7 of the fan is indicated by a dotted line. A rotor shaft 8 is provided at the end D. The rotational direction of the rotor is such that, as seen from the end of the shaft 8, the shaft rotates clockwise.

The first bearing 2 provided at the end N 3 is located within a bearing housing 9. Correspondingly, the second bearing 4 is located within a bearing housing 10. The bearing housings 9, 10 enclose an oil sump which contains the oil that lubricates and cools the bearings 2, 4. The bearings 2, 4 are of such a type that they include an oil scraper ring which feeds oil into the space between a bearing and the rotor shaft. In FIG. 2, an oil scraper ring 13 is indicated by a dotted line, and so is the level of oil in the oil sump. The housing 7 is provided with a monitoring window (not shown in the figure) through which the oil level of the oil sump can be observed.

As the electric motor rotates, the end D, which is located farther from the fan 6, warms more than the end N. The oil located close to the oil level of the oil sump of the bearing 4 and near the shaft 8 warms the most. The oil located in the proximity of the bottom of the bearing housing 10 warms significantly less. Correspondingly, at the end N, the oil located close to the oil level of the oil sump of the bearing 2 and near the rotor shaft warms more than the oil located in the proximity of the bottom of the bearing housing 9. In order to reduce the temperature of the oil at the end D 5 and to reduce the differences in temperature, the electric motor includes a first oil pipe 11 and a second oil pipe 12 which connect the oil sumps of the bearing housings 9, 10 to each other. The oil pipes 11, 12 are arranged to the bearing housings 9, 10 in such a manner that a free circulation resulting from the differences in temperature of the oil is produced. The orifice OD1 of the oil pipe 11 at the end D 5 is arranged in the proximity of the oil surface of the oil sump of the end D, near the lower part of the rim of the oil scraper ring (part 13 in FIG. 2) of the bearing 4, and the orifice ON1 of the oil pipe at the end N 3 is arranged in the proximity of the bottom of the oil sump of the end N. The orifices OD1, ON1 are at least partly immersed in oil. The relatively hot oil located in the proximity of the oil surface of the end D 5 is thus able to freely flow in the direction of the arrow to the proximity of the bottom of the oil sump of the end N 3, wherein is located relatively cold oil, which warms up as a result of the oil flow. Correspondingly, the orifice ON2 of the oil pipe 12 at the end N 3 is arranged in the proximity of the oil surface of the oil sump of the end N, near to the lower part of the rim of the oil scraper ring of the bearing 2, and the orifice OD2 of the oil pipe at the end D 5 is arranged in the proximity of the bottom of the oil sump of the end D, whereby the relatively hot oil located in the proximity of the oil surface of the oil sump of the end N is able to freely flow through the pipe 12 in the direction of the arrow to the proximity of the bottom of the oil sump of the end D, wherein is located relatively cold oil, which warms up as a result of the oil flow. Oil flows simultaneously in the pipes 11 and 12, and in both bearing spaces of the bearing housings 9, 10, the relatively cold oil moves upwards to cool a corresponding bearing 2, 4. The described lubrication system levels the differences in temperature of the end D and the end N.

It is apparent from FIG. 2 that at the end D of the electric motor, the orifice OD2 of the second pipe 12 is smaller than the orifice OD1 of the first pipe 11, i.e. the orifice OD2 located near the bottom of the oil sump is smaller than the orifice OD1 located near the oil level of the oil sump. Correspondingly, the orifice ON1 of the first pipe 11 at the end N of the electric motor is smaller than the orifice ON2 of the second pipe. The pipes 11, 12 could alternatively be narrowed in diameter farther from the orifices OD2, ON1 which are disposed at the lower parts of the bearing housings 9, 10.

In the case of the squirrel-cage motor mentioned above, it was possible to reduce the temperature of the end D from temperature 78.5° C. to temperature 63.2° C. in the construction of FIG. 1, the warming up of the end D being thus only 39.7° C. The difference in temperature between the end D and the end N was only 4° C.

If the direction of rotation of the rotor is the opposite in the solution of FIGS. 1 and 2, the oil pipes 11, 12 with their orifices are disposed on the opposite side of the motor frame. It has been noticed that the bearing 4 of the end D 5 can be cooled more efficiently when the orifices of the oil pipes, especially the orifices ON2, OD1 located uppermost in each bearing housing 9, 10, are disposed in the mentioned manner in relation to the direction of rotation of the rotor.

FIG. 3, in which reference numerals corresponding to those used in FIG. 1 are employed for corresponding components, shows an embodiment wherein the oil flow between the oil sumps of the bearing housings 9', 10' is implemented in a forced manner by means of a pump 15'. The pump 15' is mounted in series with a first pipe 11'. When the lubrication system is in operation, the orifice OD1 of the pipe 11' at the end D 5' feeds relatively cold oil arriving from the orifice ON1 of the pipe located at the end N 3' to a bearing 4' by means of the pump 15', the orifice at the end N being located significantly lower than the oil surface of the oil sump of the end N. The oil is fed into the area of the oil scraper ring of the bearing 4'. The oil scraper ring is of the same type as in FIG. 2. The feed can be implemented by arranging the orifice OD1 of the pipe 11' at the end D near the oil scraper ring, but alternatively and preferably, the orifice OD1 is located considerably higher in the oil sump of the oil frame 10', for instance entirely above the oil scraper ring, because the cooling is thus rendered very efficient. It is desirable that the orifice ON1' of the pipe 11' at the end N be located near the bottom of the oil sump of the oil frame 9', where the oil is coldest. An oil pipe 12' also connects the oil sumps of the end N and the end D with each other. The orifice OD2' of the oil pipe 12' at the end D 5' is arranged at or below the oil level of the oil sump of the oil frame 10', near the lower part of the rim of the oil scraper ring. The orifice ON2' of the oil pipe 12' at the end N is arranged near the lower part of the rim of the oil scraper ring of the oil sump of the oil frame 9'. Through the oil pipe 12', the oil is able to freely flow from the end D to the end N as indicated by the arrow, the oil levels of the oil frames 10' and 9' thus also remaining the same. The diameter of the oil pipe 12' is considerably larger than that of the oil pipe 11'.

In the case of the squirrel-cage motor mentioned above, when the direction of rotation of the rotor is counterclockwise as seen from the end of the shaft 8', it was possible to reduce the temperature of the end D from temperature 78.5° C. to temperature 53.7° C., the warming up of the end D being thus only 30.2° C. The difference in temperature between the end N and the end D was 5.3° C., the end D being thus colder. The mentioned values were obtained when the oil flow in the pipes was about 0.9 l/min. If the direction of rotation of the rotor is clockwise as seen from the end of the shaft 8', the oil pipes 11', 12', or rather the orifices thereof, are located on the opposite side of the motor frame. This is preferable especially as regards the orifices of the oil pipe 12'.

The invention has been described above by means of only two preferred embodiments, and it is therefore noted that the details of the invention can be implemented in various ways within the scope of the appended claims and the inventive concept. Accordingly, it is not necessary for the electric apparatus to be a ribbed squirrel-cage motor provided with a fan at one end, but the invention can be applied to electric apparatuses of several types, wherein the object is to control the problems relating to the temperature of sliding bearing applications by levelling the temperatures between the sliding bearings by means of passages. The number of bearing housings may be large. Naturally, the number of passages may also vary, and the location of the orifices thereof in the bearing housings may vary. In addition to pipes, hoses and practically any arrangements by which oil can be conducted from a bearing housing into another can act as passages.

I claim:

1. An electric apparatus journalled by means of sliding bearings, comprising an end N at which is located a fan and an end D at which is located a shaft, and a rotor, one end of which is journalled by means of a first sliding bearing at the end N and the opposite end of which is journalled by means of a second sliding bearing at the end D, the end N being provided with a first bearing housing with an oil sump for the first sliding bearing and the end D being provided with a second bearing housing with an oil sump for the second sliding bearing, and a passage system which connects the oil sumps of the end N and the end D to enable the oil located in the oil sumps to circulate between the end N and the end D, said passage system comprising a first passage comprising an orifice at the end D and an orifice at the end N, the orifice at the end D being disposed in the vicinity of an oil surface of the oil sump of the end D, and the orifice at the end N being disposed at least partly in an area below an oil surface of the oil sump of the end N; and a second passage comprising an orifice at the end N and an orifice at the end D, the orifice at the end N being disposed at least partly in the vicinity of the oil surface of the oil sump of the end N, and the orifice at the end D being disposed in an area below the oil surface of the oil sump of the end D, the oil circulation being thus implemented with free circulation.

2. An electric apparatus according to claim 1, wherein the orifice of the second passage located in the vicinity of the oil surface of the oil sump of the end N is arranged at the same level with the lower part of a rim of an oil scraper ring of the first sliding bearing, and the orifice of the first passage located in the vicinity of the oil surface of the oil sump of the end D is arranged at the same level with the lower part of a rim of an oil scraper ring of the second sliding bearing.

3. An electric apparatus according to claim 1, wherein the orifice of the first passage at the end N is located in the vicinity of the bottom of the oil sump of the end N, and the orifice of the second passage at the end D is located in the vicinity of the bottom of the oil sump of the end D.

4. An electric apparatus according to claim 1, wherein a diameter of the orifice of the first passage at the end N is smaller than a diameter of the orifice of the second passage at the end N, and a diameter of the orifice of the second passage at the end D is smaller than a diameter of the orifice of the first passage at the end D.

5. An electric apparatus journalled by means of sliding bearings, comprising an end N at which is located a fan and an end D at which is located a shaft, and a rotor, one end of which is journalled by means of a first sliding bearing at the end N and the opposite end of which is journalled by means of a second sliding bearing at the end D, the end N being provided with a first bearing housing with an oil sump for the first sliding bearing and the end D being provided with a second bearing housing with an oil sump for the second sliding bearing, and a passage system which connects the oil sumps of the end N and the end D to enable the oil located in the oil sumps to circulate between the end N and the end D, wherein a pump for circulating oil in the passage system is provided, said passage system comprising a first passage with an orifice at the end D and an orifice at the end N, the orifice at the end D being arranged to feed oil arriving from the end N to the vicinity of an oil surface of the oil sump of the end D, and the orifice at the end N being disposed in an area below an oil surface of the oil sump of the end N; and a second passage comprising an orifice at the end N and an orifice at the end D, the orifice at the end N being arranged to feed oil arriving from the end D to the vicinity of the oil surface of the oil sump of the end N, and the orifice at the end D being disposed in the vicinity of the oil surface of the oil sump of the end D.

6. An electric apparatus according to claim 5, wherein the orifice of the first passage at the end N is located in the vicinity of the bottom of the oil sump of the end N, and that the orifice of the second passage at the end D is located below the orifice of the first passage at the end D.

7. An electric apparatus according to claim 5, wherein the orifice of the second passage at the end N is arranged to feed oil to a lower part of a rim of an oil scraper ring of the first sliding bearing located at the end N, and the orifice of the first passage at the end D is arranged to feed oil to above the oil level of the oil sump of the end D, to a lower part of a rim of an oil scraper ring of the second sliding bearing.

8. An electric apparatus according to claim 5, wherein the pump is arranged at the first passage.

9. An electric apparatus according to claim 5, wherein a diameter of the first passage is smaller than a diameter of the second passage.

* * * * *